United States Patent [19]

Kim et al.

[11] Patent Number: 5,383,173
[45] Date of Patent: Jan. 17, 1995

[54] OPTICAL PICK-UP UTILIZING A PHASE DIFFRACTION GRATING FOR DIFFRACTING REFLECTED LIGHT IN TWO DIRECTIONS

[75] Inventors: Young-woong Kim; Chul-woo Lee, both of Seoul, Rep. of Korea

[73] Assignee: Samsung Electronics Co., Ltd., Kyungki-do, Rep. of Korea

[21] Appl. No.: 40,008

[22] Filed: Mar. 30, 1993

[30] Foreign Application Priority Data

Mar. 31, 1992 [KR] Rep. of Korea .................... 92-5405

[51] Int. Cl.$^6$ .................................... G11B 7/00
[52] U.S. Cl. ..................... 369/112; 369/13; 369/44.14; 369/109; 369/110
[58] Field of Search .............. 369/44.14, 44.37, 44.23, 369/112, 44.38, 44.35, 44.42, 13, 110, 109; 360/114

[56] References Cited

U.S. PATENT DOCUMENTS

| | | | |
|---|---|---|---|
| 4,558,440 | 12/1985 | Tomita | 369/110 |
| 4,561,032 | 12/1985 | Matsumoto et al. | 369/110 |
| 4,695,992 | 9/1987 | Aol | 369/44.38 |
| 4,794,585 | 12/1988 | Lee | 369/112 |
| 4,918,679 | 4/1990 | Opheij et al. | 369/112 |
| 5,115,420 | 5/1992 | Finkelstein et al. | 369/112 |
| 5,231,620 | 7/1993 | Ohuchida | 369/109 |
| 5,245,596 | 9/1993 | Gupta et al. | 369/109 |

Primary Examiner—Paul M. Dzierzynski
Assistant Examiner—Kim-Kwok Chu
Attorney, Agent, or Firm—Rothwell, Figg, Ernst & Kurz

[57] ABSTRACT

An optical pickup for recording and reproducing information via a magneto-optical disk comprises a phase-diffraction grating which is diffracted in two directions perpendicular to each other on a plane perpendicular to a beam axis. The diffracted light of the phase-diffraction grating has a different phase for each direction, and the phases are varied according to the polarization angle which is rotated by the Kerr effect of the magneto-optical disk. The reproduction signal is detected using the intensity variation of the diffracted light of the two directions due to the phase change. Also, the focus error signal according to the oscillation of the magneto-optical disk is detected by condensing the diffracted light of the phase-diffraction grating by means of the condensing lens and using the amplitude change of the diffracted light. Such an optical pickup is not affected by the variation of the light quantity, thereby contributing to clear reproduction and the enhancement of the signal-to-noise ratio.

8 Claims, 5 Drawing Sheets

OPTICAL PICK-UP UTILIZING A PHASE DIFFRACTION GRATING FOR DIFFRACTING REFLECTED LIGHT IN TWO DIRECTIONS

FIELD OF THE INVENTION

The present invention relates to an optical pickup which projects light onto an optical recording medium to detect the light reflected therefrom, thereby performing optical recording and reproducing operations, and more particularly to an optical pickup which diffracts the reflected light from the optical recording medium and decodes the recorded information using the phase shift of tile diffracted light.

BACKGROUND AND DESCRIPTION OF THE RELATED ART

Generally, optical pickups for recording and reproducing information via a magneto-optical disk detect the reflected light beams whose polarization angle is rotated by means of a magneto-optic effect (called the Kerr effect) of the recording portion of the magneto-optical disk, to decode the recorded information. To more specifically describe the detection process, FIG. 1 shows a conventional simple optical pickup for recording and reproducing the information of the magneto-optical disk.

Figure 1:
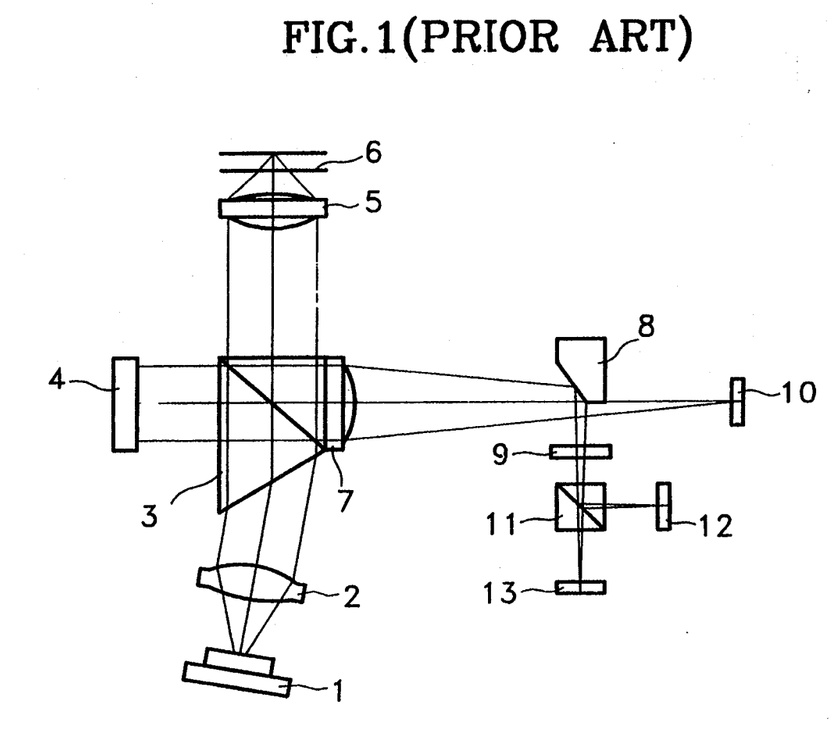
FIG. 1 is a plan view of a conventional optical pickup which is used in a magneto-optical disk drive.

In FIG. 1, the laser beam emitted from a laser diode 1 is a linearly polarized wave. The light beam of the linearly polarized wave advances parallel to the beam axis by means of collimating lens 2. A beam-shaping separation prism 3 shapes the cross-sectional surface of the light beam into a true circle. Then, the shaped light beam is separated so that one part thereof is transmitted to a monitor photo detector 4 and the remainder continues along a straight path. This portion of the linear polarized light beam which is not redirected by beam shaping separation prism 3 is collected in a magneto-optical disk 6 via an objective lens 5. The light beam reflected from magneto-optical disk 6 reversely passes through objective lens 5. Then, part of the reversely passed light is transmitted directly to laser diode 1 via beam-shaping separation prism 3 and the remainder thereof is transmitted forward through a focus lens 7. The part of the reflected light beam which passes through focus lens 7 is reflected at a reflective knife-edge prism 8 to proceed to a half-wavelength plate 9. While the remainder thereof advances directly to a focusing photo detector 10. The light reflected from the recording portion of magneto-optical disk 6 has a linearly polarized wave, with its polarization angle rotated by the Kerr effect. Half-wavelength plate 9 passes the linear polarized wave whose polarization angle is rotated. The reflected light beam which passes half-wavelength plate 9 is again polarization-separated into two components by polarized beam splitter 11, so that the two separated light beams respectively arrive at two reproduction photo detectors 12 and 13. The reproduction signal for the information recorded on the magneto-optical disk is obtained by a differential signal between photo detectors 12 and 13. That is, the conventional optical pickup for the magneto-optical disk polarization-separates the reflected light beam whose polarization angle is rotated, and detects the differential signal due to the difference of the quantity of light between the two components so as to decode the information.

In such a conventional optical pickup, part of the reflected light beam, i.e., that at the unrecorded portion of the magneto-optical disk, is again incident upon the laser diode. Accordingly, since the light oscillation of the laser diode is very unstable, noise is generated. Therefore, to suppress such noise generation, the laser diode should be driven with a costly high-frequency oscillator. Also, since the light beam is separated in each of the beam-shaping separation prism, knife-edge prism and polarized beam splitter, the quantity of light which reaches the respective photo detection elements becomes very small. Thus, the signal-to-noise ratio is low. When the fluctuation of the quantity of light is severe, errors are generated in the servo control of the objective lens.

According to a technology disclosed in U.S. Pat. No. 5,115,420, the signal-to-noise ratio can be improved to strengthen the function of the servo control of the objective lens. That is, the wasted light beam is intercepted by a mirror at one side of a beam splitter, and is phase-coherently combined with the light reflected from a recording medium. However, even with the above technology, it is inevitable that part of the reflected light beams is again incident upon the laser diode, and problems still persist in the generation of servo control errors due to fluctuations in the quantity of light (intensity).

The above problems reside in the fact that the detection of a control signal for objective lens focusing and tracking servo operation, is impossible using only a reflected light beam whose polarization angle is rotated.

SUMMARY OF THE INVENTION

Therefore, to solve the defects of the conventional optical pickup as described above, it is an object of the present invention to provide an optical pickup which comprises an optical circuit for diffracting a reflected light beam from a recording medium in different directions according to the information recorded on the recording medium, so as to generate phase differences in the respective directions while decoding the information from the phase differences, thereby suppressing the generation of errors and maximizing the signal-to-noise ratio.

To accomplish the above object of the present invention, there is provided an optical pickup comprising:

a light generation device for generating a light beam;

an objective lens for focusing and projecting the generated light beam onto a light recording medium;

light path separation means for separating a reflected light beam of the light recording medium from an incident light beam transmitted forwarded from the light generation device to an objective lens;

a phase-diffraction grating for diffracting the separated reflected light beam in two directions on a surface perpendicular to the beam axis; and means for detecting an electrical signal from the diffracted and separated reflected light beam.

In the present invention, the reflected light beam is diffracted in two directions on a surface perpendicular to the beam axis, by the phase-diffraction grating. When the polarization angle of the reflected light beam reflected from the recording and non-recording portions of the magneto-optical disk is varied, the diffraction ratio of the phase-diffraction grating is changed and the quantity of light (intensity) of the diffracted light is changed. Thus, it is possible to detect the reproduction signal according to the change of the light quantity of the diffracted light. Also, since the diffraction ratio of the phase-diffraction grating is dependent upon the angle of incidence of the reflected light beam, it is possible to change the amplitude thereof when focusing the diffracted light beam. In other words, it is possible to detect a servo control signal (such as the focus error signal of the objective lens) from the diffracted light. That is, according to the present invention, the reflected light beam does not need to be separated in order to detect the reproduction signal and the control signal. Therefore, in the present invention, by properly providing the light path separation means, it is possible to prevent the reflected light beam of the light recording medium from being again incident upon the light generation device.

BRIEF DESCRIPTION OF THE DRAWINGS

The above objects and other advantages of the present invention will become more apparent by describing in detail a preferred embodiment thereof with reference to the attached drawings in which.

DETAILED DESCRIPTION OF THE INVENTION

The preferred embodiment of the optical pickup according to the present invention which diffracts the reflected light beam and decodes the recording information using the phase variation of the diffracted light according to the diffraction characteristics, will be described below in detail with reference to the accompanying drawings. In the drawings, for the convenience of explanation, like reference numerals identify like elements with respect to the same parts depicted in FIG. 1.

Figure 2:
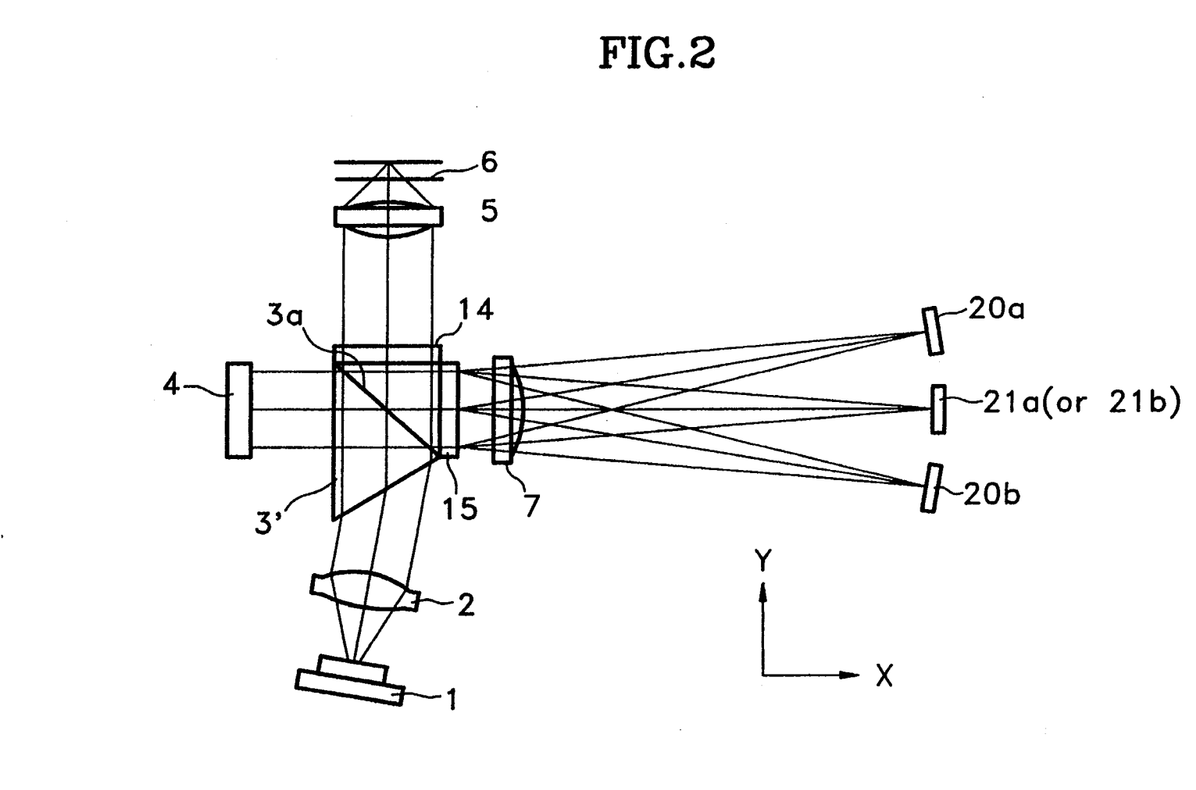
FIG. 2 is a plan view of an optical pickup according to a preferred embodiment of the present invention.

The optical pickup according to the preferred embodiment of the present invention is shown in FIG. 2. In FIG. 2, laser diode 1 generates oscillated light beams in almost all the directions. Collimating lens 2 advances the light beam parallel to the beam axis. Beam-shaping separation prism 3' shapes the cross-sectional surfaces of the parallel light beam into a true circle. Then, the shaped light beam is separated so that part of the shaped light beam is transmitted to monitor photo detector 4, and the remainder thereof is focussed on magneto-optical disk 6 by means of objective lens 5. Here, to prevent the light beam reflected from the magneto-optical disk from being again incident upon laser diode 1, the present invention forms a polarized coating portion 3a in beam-shaping separation prism 3' and installs a quarter-wavelength plate 14 between the beam-shaping separation prism and objective lens 5. Accordingly, only the linearly polarized wave components having a predetermined angle among the light transmitted forward of laser diode 1 to magneto-optical disk 6 passes through polarized coating portion 3a of beam-shaping separation prism 3', while the remainder reaches monitor photo detector 4. That is, the light passing straight through beam-shaping separation prism 3' is a linearly polarized wave. After light beam having a linearly polarized wave passes through quarter-wavelength plate 14, this light becomes circularly polarized. Thus, the incident light focussed on objective lens 5 has a circularly polarized wave, and the light beam reflected from magneto-optical disk 6 is also circularly polarized. After the reflected beam of the circularly polarized wave reversely passes through objective lens 5 and quarter-wavelength plate 14, the circularly polarize wave is changed into a different linearly polarized wave which is obtained by rotating the linearly polarized wave of the incident light beam by 90°. Thus, the reflected light does not pass through polarized coating portion 3a of beam-shaping separation prism 3' and all light is reflected toward phase-diffraction grating 15.

Figure 3:
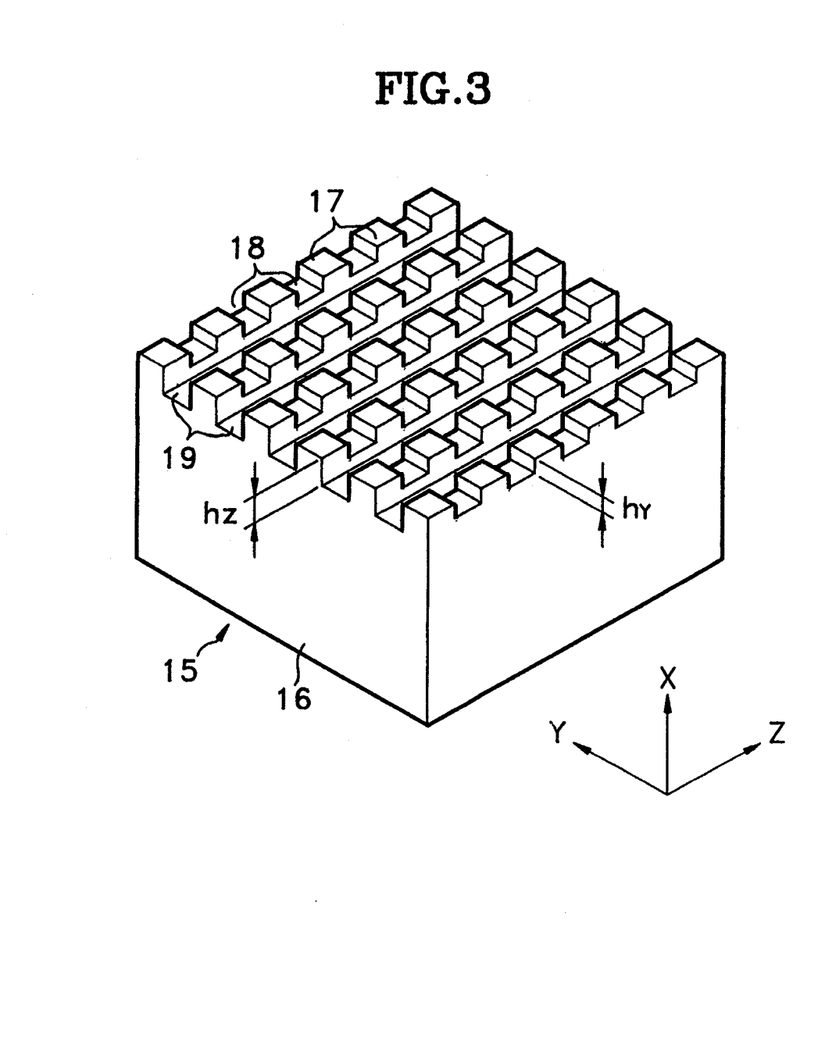
FIG. 3 is a perspective view of a part of the diffraction grating shown in FIG. 2.

Phase-diffraction grating 15 is shown in FIG. 3, and has a structure wherein a plurality of protrusions 17 are formed in a checker on a substrate 16. The plurality of protrusions 17 is partitioned by Y-axis grooves 18 and Z-axis grooves 19 which have differenting depths, while the X-axis is coincident with the thickness dimension of substrate 16. Here, the refractive indices of the Y-axis and Z-axis directions are different from each other. Thus, the reflected light beams are diffracted in the Y-axis and Z-axis directions by phase-diffraction grating 15. Accordingly, a phase difference is generated in the diffracted light of the respective directions.

Figure 5:
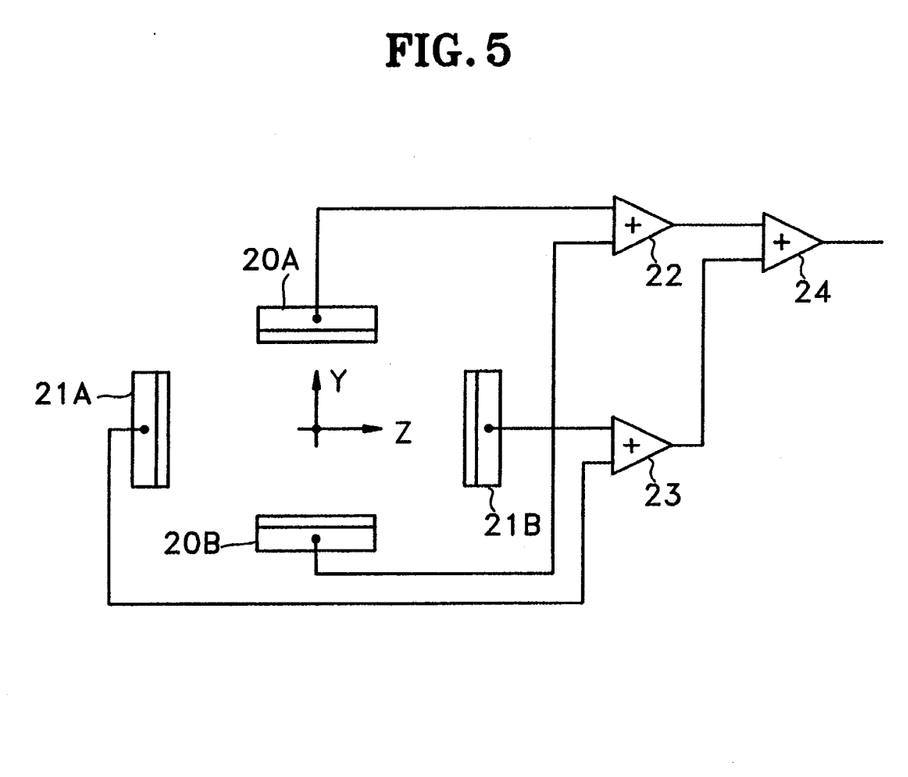
FIG. 5 is a circuit diagram for explaining the detection operation of the reproduction signal in the optical pickup according to the preferred embodiment of the present invention.

Referring again to FIG. 2, the light diffracted by phase-diffraction grating 15 is condensed by condensing lens 7. The positive and negative first degree diffracted light of the respective directions are detected by four photo detectors 20a, 20b, 21a and 21b which are disposed on the same spherical surface from the diffraction center of phase-diffraction grating 15, up and down and to the left and right, as shown in FIG. 5.

In the optical pickup according to the present invention as described above, the diffraction features of phase-diffraction grating 15 will be described below.

Figure 4A:
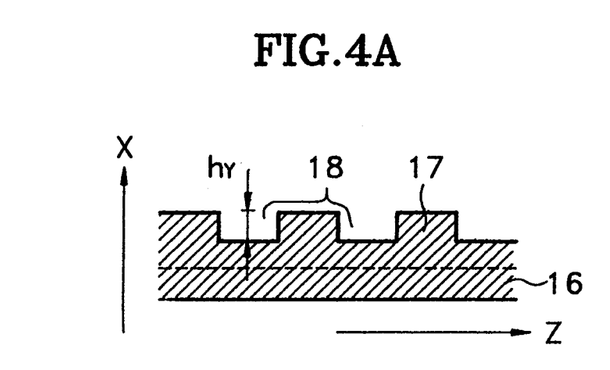
FIGS. 4A and 4B are cross-sectional views for explaining the structure of the diffraction grating shown in FIG. 3.
Figure 4B:
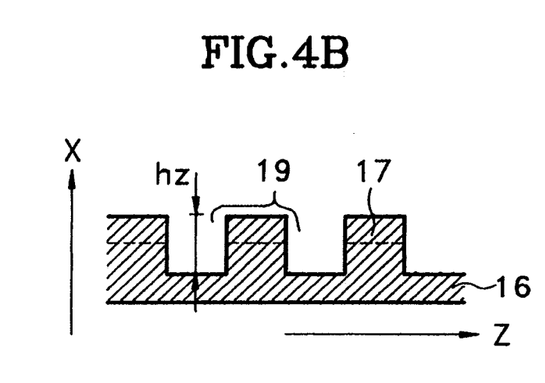

As shown in FIGS. 4A and 4B, assuming that the depths of Y-axis and Z-axis grooves 18 and 19 are $h_Y$ and $h_Z$, respectively, and the phases of the Y-axis and Z-axis directions for positive and negative first degree diffracted light which passes through phase-diffraction grating 15 are $\delta_Y$ and $\delta_Z$, the respective phases are represented as follows:

$$\delta_Y = 2\pi \eta_Y h_Y / \lambda$$

$$\delta_Z = 2\pi \eta_Z h_Z / \lambda$$

where $\eta_Y$ and $\eta_Z$ represent the refractive indices of Y-axis and Z-axis directions for phase-diffraction grating 15, respectively, and $\lambda$ represents a wavelength of light.

The present invention makes the linearly polarized wave of the light beam reflected from the unrecorded portion of the magneto-optical disk 5 coincide with the diagonal direction (45°) on the Y-Z surface of phase-diffraction grating 15. Here, $h_Y$ and $h_Z$ are set so that the phase difference of the Y-axis and Z-axis directions with respect to the positive and negative first degree diffracted light beam becomes 180°, and, desirably, the phases become $\pi/2$ and $3\pi/2$, respectively.

The linearly polarized wave of the light beam reflected from the recording portion of magneto-optical disk 6 is rotated by a predetermined angle according to the Kerr effect, the phases of the positive and negative first degree diffracted light beam according to phase-diffraction grating 15 will be changed. It is assumed that the phase change is $\Delta\delta$. Then, when the light intensity of the positive and negative first degree diffracted light beam which are diffracted in Y-axis and Z-axis directions are I(Y) and I(Z) respectively, the respective light intensities are represented as follows:

$$I(Y) = \tfrac{1}{2}I_o(Y)\{1 + \cos(\pi/2 + \Delta\delta)\} \quad (1)$$
$$= \tfrac{1}{2}I_o(Y)\{1 - \sin(\Delta\delta)\}$$

and $$I(Z) = \tfrac{1}{2}I_o(Z)\{1 + \cos(3\pi/2 + \Delta\delta)\} \quad (2)$$
$$= \tfrac{1}{2}I_o(Z)\{1 + \sin(\Delta\delta)\}$$

where $I_o(Y)$ and $I_o(Z)$ represent the light intensities of the Y-axis and Z-axis components for the reflected light beam, when the light beam reflected from the non-recording portion of magneto-optical disk 6 is incident upon phase-diffraction grating 15.

Assuming that $\Delta\delta$ is sufficiently small with respect to $\pi/2$, the above equations (1) and (2) can be rewritten:

$$I(Y) \approx \tfrac{1}{2}I_o(Y)(1-\Delta\delta)$$

$$I(Z) \approx \tfrac{1}{2}I_o(Z)(1+\Delta\delta)$$

In other words, the phase difference $\Delta\delta$ in the Y-axis and Z-axis directions occurring in the positive and negative first degree diffracted light of the reflected light beam of the polarization angle is rotated by the Kerr effect of magneto-optical disk 6. Accordingly, it can be seen that the difference between the light intensities of the positive and negative first degree diffracted light for the predetermined directions occurs according to phase difference $\Delta\delta$, and can be expressed:

$$\Delta I = |I(Y) - I(Z)|$$
$$\approx \tfrac{1}{2}I_o\Delta\delta$$

Since such a difference between the light intensities is due to the rotation of the polarization angle of the light beam reflected from the recording portion in the magneto-optical disk, the difference of the light intensities represents the possibility of detecting the reproduction signal.

Thus, in the optical pickup according to the present invention, as shown in FIG. 5, the detection signals of photo detectors 20a and 20b corresponding to the Y-axis and the detection signals of photo detectors 21a and 21b corresponding to the Z-axis, are added in summing amplifiers 22 and 23, respectively. Then, the outputs of summing amplifiers 22 and 23 are differentially amplified by differential amplifier 24 to obtain the reproduction signal.

Figure 6A:
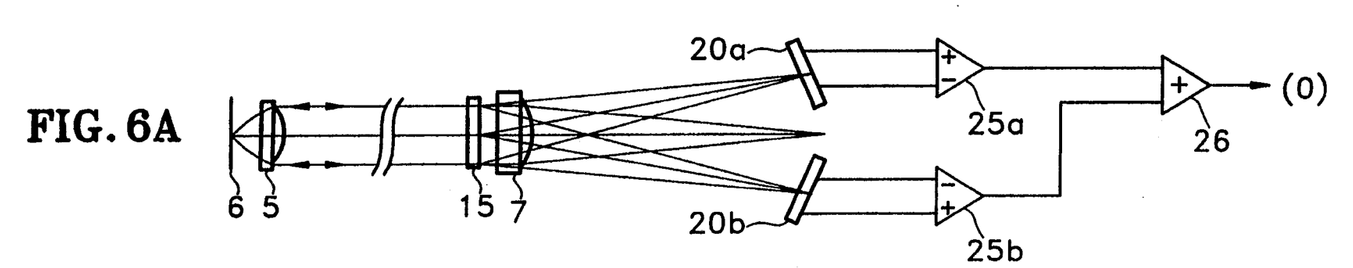
FIGS. 6A, 6B and 6C are circuit diagrams for explaining the detection operations of the respective focus error signals along the light beam path according to the distance between the magneto-optical disk and the objective lens, in the optical pickup according to the preferred embodiment of the present invention.
Figure 6B:
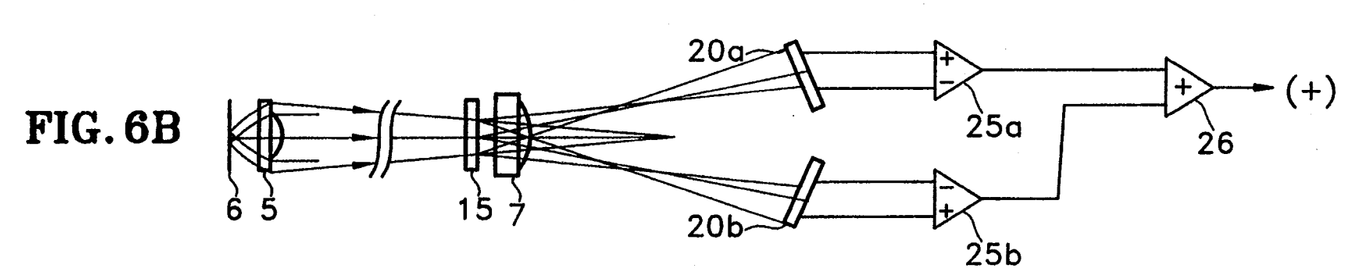
Figure 6C:
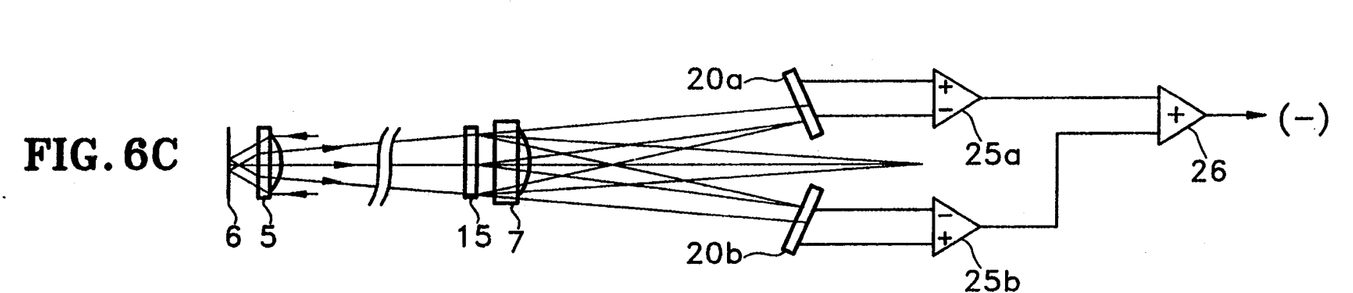

Then, FIGS. 6A, 6B and 6C show circuits for detecting the focus error signals according to the vibration of the magneto-optical disk, in the optical pickup according to the present invention. Here, FIG. 6A represents magneto-optical disk 6 being placed at a focus distance of objective lens 5, FIG. 6B shows the disk being placed at a position beyond the focus distance, and FIG. 6C shows the former being placed on a position within the focus distance. Two-divisional photo detectors $20a'$ and $20b'$ are disposed as shown in FIGS. 6A. 6B and 6C, in order to detect the positive and negative first degree diffracted light of the Y-axis direction. When the detection signals of two-divisional photo detectors $20a'$ and $20b'$ are differentially amplified by differential amplifiers 25a and 25b, respectively, and the outputs of differential amplifiers 25a and 25b are added in respective summing amplifiers 26, the focus error signals are obtained.

In FIG. 6A. the reflected light beam passing through objective lens 5 after being reflected from magneto-optical disk 6 advances in parallel with the beam axis. The positive and negative first degree diffracted light of the parallel-advancing reflected light beam by means of phase-diffraction grating 15 is condensed on the centers of the two-divisional photo detectors by means of focus lens 7. Thus, the output of summing amplifier 26 becomes "0." However, when magneto-optical disk 6 is placed beyond the focus distance of objective lens 5 as shown in FIG. 6B, the reflected light beam passes through phase-diffraction grating 15 and focus lens 7 in a collective shape. In this case, the amplitude of the light beam which is detected at a positive region of two-divisional photo detectors $20a'$ and $20b'$ becomes large, while the amplitude of the light beam detected at a negative region becomes relatively small. Thus, the error signal output from summing amplifier 26 has a positive value. On the other hand, when magneto-optical disk 6 is placed within the focus distance of objective lens 5 as shown in FIG. 6C, the reflected light beam passes through phase-diffraction grating 15 and focus lens 7 in a diffused shape. In this case, conversely, a focus error signal having a negative value is output.

The focus error signals obtained by the above processes are sent to a focussing actuator (not shown) of objective lens 5, as usual, to thereby compensate the focus error.

As described above, since the optical pickup according to the present invention prevents the reflected light beam from being again incident on the laser diode, the generation of errors is greatly reduced. Thus, the driving of the laser diode becomes facilitated. Also, in the optical pickup according to the present invention, since no part of the reflected light beam is lost, and all of the reflected light beam is used for detection of the reproduction signal and control signal, the signal-to-noise ratio is high. Particularly, in the optical pickup according to the present invention, the reproduction signal is detected using the difference between the light intensities due to the phase variation of the diffracted light according to the polarization direction of the magneto-optical disk, and the control signal is detected using the diffracted light whose amplitude is varied according to the vibration of the magneto-optical disk. Accordingly, the reproduction signal and control signal are much less affected by the variation of the light quantity (intensity). Thus, the present invention is very effective for clear reproduction using an optical pickup, and for the enhancement of the servo control function of an objective lens.

What is claimed is:

1. An optical pickup comprising:

a light generation device for generating a light beam;

an objective lens for collecting and projecting said generated light beam onto a light recording medium;

light path separation means for separating a reflected light beam of the light recording medium from an incident light beam transmitted forward from the light generation device to an objective lens;

a two dimensional phase-diffraction grating for diffracting said separated reflected light beam in two mutually perpendicular directions on a surface perpendicular to the incident light beam axis; and means for detecting an electrical signal from said diffracted and separated reflected light beam.

2. The optical pickup according to claim 1, wherein said separation means comprises:

a polarization beam separation device having a polarization coating surface through which passes only the linearly polarized component of a predetermined direction among the light beam generated from said light generation device; and a quarter-wavelength plate disposed between said polarization beam separation device and said objective lens.

3. The optical pickup according to claim 2, wherein the light diffracted by said two dimensional phase-diffraction grating has a phase difference of 180° in two directions thereof.

4. The optical pickup according to claim 1, wherein the light diffracted by said two dimensional phase-diffraction grating has a phase difference of 180° in two directions thereof.

5. The optical pickup according to claim 1, wherein said two dimensional phase-diffraction grating comprises a plurality of protrusions partitioned by first and second directional grooves formed on a substrate so as to have different depths.

6. The optical pickup according to claim 1, wherein the linearly polarized wave of the light beam reflected from the recording portion of the light recording medium is coincident with the diagonal direction of said two dimensional phase-diffraction grating, and the phase of one direction for the diffracted light of the reflected light beam is $\pi/2$ while the phase of the other direction is $3\pi/2$.

7. The optical pickup according to claim 1, wherein said detection means comprises a circuit for detecting a reproduction signal by having four photo detectors for detecting positive and negative first degree diffracted light of said two dimensional phase-diffraction grating, two summing amplifiers for summing the detection signals corresponding to the same diffraction direction among said four photo detectors, and a differential amplifier for differentially amplifying the output of said two summing amplifiers.

8. The optical pickup according to claim 1, wherein said detection means comprises a control signal detector having a condensing lens for condensing the diffracted light so as to change the amplitude of the diffracted light of said two dimensional phase-diffraction grating according to the vibration of said light recording medium, and two-divisional photo detectors for detecting the diffracted light of at least one direction, thereby detecting a focus error signal using said two-divisional photo detectors.

* * * * *

UNITED STATES PATENT AND TRADEMARK OFFICE
CERTIFICATE OF CORRECTION

PATENT NO. : 5,383,173
DATED : January 17, 1995
INVENTOR(S) : Young-woong Kim et al.

It is certified that error appears in the above-identified patent and that said Letters Patent is hereby corrected as shown below:

Col. 1, line 14, "tile" should be --the--.

Col. 1, lines 47-48, "9. While" should be --9, while--.

Col. 2, line 16, "5,115.420" should be --5,115,420--.

Signed and Sealed this

Twentieth Day of June, 1995

Attest:

BRUCE LEHMAN

*Attesting Officer*   *Commissioner of Patents and Trademarks*